(12) United States Patent
Oertel et al.

(10) Patent No.: US 10,668,791 B2
(45) Date of Patent: Jun. 2, 2020

(54) CARRIER MEMBER WITH SPECIFIC SEAL CHANNEL

(71) Applicant: Brose Fahrzeugteile GmbH & Co. KG, Hallstadt (DE)

(72) Inventors: Nico Oertel, Zapfendorf (DE); Melanie Angermueller, Hellingen (DE); Thomas Salhoff, Hallstadt (DE); Matthias Heppner, Burgkunstadt (DE); David Krause, Ebelsbach (DE); Robert Mantel, Hirschaid (DE); Andre Bernhard, Rattelsdorf (DE); Michael Salzmann, Bamberg (DE)

(73) Assignee: BROSE FAHRZEUGTEILE GMBH & CO. KG, HALLSTADT, Hallstadt (DE)

( * ) Notice: Subject to any disclaimer, the term of this patent is extended or adjusted under 35 U.S.C. 154(b) by 0 days.

(21) Appl. No.: 15/084,283

(22) Filed: Mar. 29, 2016

(65) Prior Publication Data

US 2016/0288630 A1 Oct. 6, 2016

(30) Foreign Application Priority Data

Mar. 30, 2015 (DE) .................. 10 2015 205 667

(51) Int. Cl.
*B60J 5/04* (2006.01)
*F16J 15/10* (2006.01)
*F16M 13/02* (2006.01)

(52) U.S. Cl.
CPC .......... *B60J 5/0468* (2013.01); *B60J 5/0416* (2013.01); *B60J 5/0418* (2013.01); *F16J 15/10* (2013.01); *F16M 13/02* (2013.01)

(58) Field of Classification Search
CPC ...... B60J 5/0468; B60J 5/0416; B60J 5/0418; F16J 15/10; F16M 13/02

(Continued)

(56) References Cited

U.S. PATENT DOCUMENTS

| | | | | |
|---|---|---|---|---|
| 6,571,515 | B1 * | 6/2003 | Samways | B60J 5/0416 49/352 |
| 6,725,606 | B2 * | 4/2004 | Nishikawa | B60J 5/0416 49/502 |
| 6,938,944 | B2 * | 9/2005 | Koa | B60J 5/0404 296/1.11 |
| 6,971,206 | B2 * | 12/2005 | Fukumoto | B60J 5/0416 49/349 |

(Continued)

FOREIGN PATENT DOCUMENTS

| CN | 201176823 Y | 1/2009 |
|---|---|---|
| CN | 101468590 A | 7/2009 |

(Continued)

OTHER PUBLICATIONS

European Search Report dated Sep. 14, 2016, 8 pages.

(Continued)

*Primary Examiner* — Kimberly T Wood
(74) *Attorney, Agent, or Firm* — Lewis Roca Rothgerber Christie LLP (57) ABSTRACT

A carrier component for a vehicle, e.g. in the form of an assembly or module carrier for a vehicle door is provided. The carrier component comprises a sealing channel at least in a protruding region in which a portion for a functional component protruding beyond the edge of the carrier base surface or for a functional component arranged to protrude from the carrier component extends across the sealing channel in cross-section is formed by at least two legs which each define an outer edge of the sealing channel and whose ends lie in a channel plane which extends inclined relative to a carrier plane defined by the carrier base surface, so that the sealing channel is open in a direction in space defining the carrier plane and a seal also can easily be injection-molded to the carrier component in the protruding region.

18 Claims, 6 Drawing Sheets

(58) Field of Classification Search
USPC .................. 49/502, 348, 349; 296/146.7
See application file for complete search history.

(56) References Cited

U.S. PATENT DOCUMENTS

| | | | | |
|---|---|---|---|---|
| 7,044,533 | B2* | 5/2006 | Dry | .................. B60J 5/0418 296/146.1 |
| 7,198,319 | B2* | 4/2007 | Schroder | .............. B60J 5/0416 296/146.7 |
| 8,065,837 | B2* | 11/2011 | Nakajima | .............. B60J 5/0416 49/352 |
| 2009/0165392 | A1 | 7/2009 | Totani et al. | |
| 2010/0084887 | A1 | 4/2010 | Krüger et al. | |

FOREIGN PATENT DOCUMENTS

| | | |
|---|---|---|
| DE | 10-2004-053-622 A1 | 5/2006 |
| DE | 20 2007 003 226 U1 | 8/2008 |
| DE | 2008 012 434 A1 | 9/2009 |
| DE | 10 2009 042 350 A1 | 3/2011 |
| JP | 2011-173571 A | 9/2011 |
| WO | WO 2006/048327 A1 | 5/2006 |
| WO | WO 2007/006296 A1 | 1/2007 |
| WO | WO 2009/106644 A1 | 9/2009 |

OTHER PUBLICATIONS

English Machine Translation of European Search Report dated Sep. 14, 2016, which was submitted Oct. 10, 2016, 3 pages.
Translation of CN First Office action issued in corresponding Chinese Application No. 2017111401956180 dated Nov. 17, 2017 submitted Dec. 27, 2017, 3 pages.
CN Second Office action issued in corresponding Chinese Application No. 2017111401956180 dated Aug. 15, 2018, 8 pages, with English translation, 3 pages.

* cited by examiner

CARRIER MEMBER WITH SPECIFIC SEAL CHANNEL

CROSS-REFERENCE TO RELATED APPLICATION

This application claims priority to German Patent Application No. 10 2015 205 667.8 filed on Mar. 30, 2015, the entirety of which is incorporated by reference herein.

BACKGROUND

The present invention in particular relates to a carrier component.

Such carrier component for example is formed by a so-called assembly or module carrier for a vehicle door. A generic carrier component however is not limited to the use within a vehicle door. In principle, a generic carrier component includes a carrier base surface on which functional components of a window lifter are provided and which defines a carrier plane along which the carrier base surface substantially extends. The carrier component furthermore is provided for mounting on a vehicle part, such as for example a door inner panel or a body part in the region of a rear fender and for this purpose includes a seal at an edge region, by means of which the carrier component can sealingly be mounted on the vehicle part. The seal here is at least partly accommodated in a sealing channel extending along the edge region of the carrier component.

Usually, such sealing channel is circumferentially provided on the carrier component and has a cross-sectional profile U-shaped in cross-section. For manufacturing the seal, sealing material preferably is injection-molded and typically dosed into the sealing channel of the lying carrier component from above. The introduction of the sealing material usually is effected by 6-axle robots and/or linear robots orthogonally to the channel bottom of the sealing channel, i.e. orthogonally to a groove base or channel bottom of the sealing contour.

In components protruding beyond an outer edge of the carrier base surface at the carrier component such introduction of the sealing material however no longer is possible. The portion protruding beyond the edge of the carrier base surface regularly also extends across at least a part of the sealing channel. Thus, the introduction of sealing material orthogonally to the channel bottom and orthogonally to the carrier plane here is prevented by the protruding portion.

For example, such protruding functional component of the window lifter is formed by a guide rail integrated into the carrier component. The same possibly protrudes beyond an upper or lower edge of the carrier base surface, in order to provide a larger stroke for the window pane to be adjusted. For such a solution, mounting of the seal then is distinctly more expensive than for example in a carrier component without such protrusions, as it is disclosed e.g. in DE 20 2007 003 226 U1.

A pull rope of the window lifter however also can protrude beyond an outer edge of the carrier base surface. The pull rope for example is deflected on a portion of the carrier component extending across the sealing channel or on a separate component which is fixed at the carrier component. Carrier components with such protruding portion, on which for stroke increase a deflection element e.g. in the form of a cable pulley is arranged, are disclosed for example in DE 10 2009 042 350 A1 and DE 10 2008 012 434 A1. The problems resulting from the protruding portion on injection-molding of the sealing material in the region of the protrusion here are circumvented by the fact that the portion is spring-mounted and hence can be folded away in the region of the protrusion or the protrusion is pivotally mounted on the carrier component and can be pivoted into a functional position in which it does not protrude beyond its outer edge. The aforementioned solutions however partly involve a high technical expenditure during manufacture and assembly.

SUMMARY

Subsequently mounting protruding portions on the carrier component, after the same has been provided with a seal, is possible in principle, but possibly also increases the assembly expenditure. In addition, carrier components with integrated window lifter guide rails, which protrude beyond an outer edge of the carrier component, are preferred for particular applications. For this purpose, too, there is sought an effective and automatable possibility for mounting a sealing material on such carrier component.

This object is solved with a vehicle carrier component as described herein.

A carrier component according to the invention in particular includes at least one sealing channel extending along an edge region of the carrier component, with a seal at least partly accommodated therein, by means of which the carrier component can sealingly be mounted on a vehicle part such as a door inner panel. At least one functional component of the window lifter protrudes beyond an outer edge of a carrier base surface of the carrier component or is arranged thereon in a way such that the functional component (partly or completely) protrudes beyond the outer edge of the carrier base surface, so that a portion of this functional component protruding beyond the edge of the carrier base surface, a portion of the carrier component carrying the functional component or a portion of a component carrying the functional component and attached to the carrier component extends across at least a part of the sealing channel. At least in a protruding region, in which the portion extends across the sealing channel, the sealing channel according to the invention in cross-section is formed by at least two legs which each define an outer edge of the sealing channel and whose ends lie in a channel plane which extends inclined relative to the carrier plane defined by the carrier base surface, so that the sealing channel is open in a direction in space defining the carrier plane and preferably a seal also can easily be injection-molded to the carrier component in the protruding region.

With a carrier component according to the invention it is possible to use essential aspects of an industrially proven method for injection molding sealing material also in the protruding region. Via the formation of the sealing channel provided according to the invention it furthermore can be ensured comparatively easily that after introducing an initially liquid sealing material into the sealing channel the same remains therein and does not flow away. In experiments, good results for example were achieved with an expandable sealing material which initially is introduced in liquid form into the sealing channel formed according to the invention and expands within few seconds. The channel plane connecting the ends of the legs of the sealing channel preferably is inclined by an angle of inclination of 30° to 60° relative to the carrier plane of the carrier component, so that the sealing channel is open in a direction in space pointing from the center of the carrier base surface to the outside. In this way, the sealing material for example can easily be introduced into the sealing channel from above along this direction in space also in the protruding region, without the sealing material still liquid flowing away.

In possible design variants the sealing channel is J- or L-shaped in cross-section at least in the protruding region. In an alternative design variant the sealing channel is U- or V-shaped in cross-section at least in the protruding region. While in a J- or L-shaped formation of the sealing channel the two legs bordering the channel are formed asymmetrical and thus not of equal length, a substantially equal length of both legs is provided in a formation of the sealing channel U- or V-shaped in cross-section.

A possible embodiment of a carrier component according to the invention for example is a module or assembly carrier for a motor vehicle door. The carrier component preferably is made of plastics. The sealing contour at the carrier component, which according to the invention is specified by the sealing channel, above all is suitable for the integration of at least one guide rail on the carrier component, which with at least one end protrudes beyond an outer edge of the carrier base surface. Nevertheless, other design variants also are possible for a carrier component according to the invention.

The at least two legs which define the cross-sectional profile of the sealing channel at least in the protruding region can be formed to protrude both from the carrier base surface and from the carrier plane. Alternatively or in addition, the at least two legs can be connected with each other via a channel bottom of the sealing channel extending between the same. Such channel bottom extending between two legs for example would be given in a formation of the sealing channel J- or U-shaped in cross-section.

In a possible development, the two legs are oriented at different angles relative to the channel bottom. For example, the lengths of the two legs and their angle relative to the channel bottom are chosen such that sealing material to be introduced into the sealing channel for forming the seal easily can be injected into the sealing channel from above substantially along the carrier plane—possibly also inclined relative to the vertical. The lengths and angles can be chosen such that during mounting of the seal the carrier component can be held in a position inclined relative to the horizontal, and the geometry of the sealing channel in the protruding region ensures that in the process the sealing material still liquid does not flow away uncontrolled.

For example, in one design variant it is provided that a first shorter (inner) leg extends at an angle to the channel bottom of the sealing channel, which is smaller than an angle at which a second longer (outer) leg extends to the channel bottom. The second longer leg, which preferably lies at the edge of the carrier base surface, thus can easily form a larger supporting surface for the expanded or cured sealing material, while via the first, short leg the sealing material still liquid above all is prevented from flowing out during manufacture. The shorter first leg preferably forms a kind of overflow edge which counteracts an outflow of the sealing material from the sealing channel.

To furthermore open the sealing channel as far as possible towards the outside in a direction in space defining the carrier plane via the second longer leg, the same preferably extends at an obtuse angle to the channel bottom. When the carrier plane consequently extends substantially along the vertical with properly mounted carrier component, the second longer leg of the sealing channel, which points to the outside, is inclined to the vertical at least in the protruding region.

The sealing channel can be formed to extend around the edge of the carrier component and include at least two regions which are different from each other in cross-section. In a protruding region, in which there is a portion protruding beyond the carrier base surface, an individual sealing channel hence can have another cross-sectional profile than in a region outside this protruding region. Thus, a manufacture of the circumferential seal hence in part also can still be effected in a conventional way, in which liquid sealing material is injected into a groove-like sealing channel U-shaped in cross-section, which is open vertically to the carrier plane, substantially vertically to the carrier plane.

Instead of an individual circumferential sealing channel with different cross-sectional profiles, at least two sealing channels different in cross-section can of course also be provided on the carrier component; on the one hand a sealing channel for the respective protruding region with a cross-sectional profile formed according to the invention and on the other hand at least one further sealing channel away from the protruding region with a differently designed cross-sectional profile, for example a conventional cross-sectional profile. The different sealing channels for example are spaced transversely to their direction of longitudinal extension and in part lie one beside the other.

According to another aspect of the invention there is furthermore proposed an assembly which beside a carrier component according to the invention includes at least one vehicle part which includes a sealing surface extending inclined relative to the carrier base surface, against which the carrier component sealingly rests in the region of its seal. The inclination of the sealing surface and the inclination of the channel plane in the protruding region of the carrier component preferably are adjusted to each other, so that via the inclined sealing surface of the vehicle part a rather large-surface contact of the seal is given with sufficient support via the two legs of the sealing channel possibly protruding from the carrier component.

For example, in the protruding region the channel plane of the sealing channel and the sealing surface of the vehicle part extend parallel to each other when the carrier component is properly mounted on the vehicle part. The oblique sealing surface for example is present at an edge of a door inner panel, which borders an assembly opening within a vehicle door. Via this assembly opening, functional components of a window lifter usually pre-mounted already on the carrier component are introduced into a cavity formed between door outer panel and door inner panel. Via the carrier component, the assembly opening then is closed sealingly. In one design variant of the invention, in contrast to previously usual constructions, the portion of the door inner panel bordering the assembly opening, against which the carrier component rests via its seal, is not designed substantially parallel to the carrier plane and hence extending substantially parallel to the vertical, but inclined thereto, preferably in direction of the assembly opening and in direction of the door outer panel.

Another aspect of the present invention is a method for manufacturing a seal on a carrier component according to the invention.

The seal is manufactured from an expandable sealing material and the expandable sealing material is dosed into the at least one sealing channel in liquid form in a quantity such that after expansion of the sealing material the seal is supported on the at least two legs of the sealing channel present in the protruding region.

Dosing of the still liquid sealing material usually is effected via a dosing head of a dosing tool. Due to the geometry of the sealing channel provided according to the invention, the dosing head also can easily be guided towards the sealing channel in the protruding region, for example substantially parallel to the carrier plane. When dosing the sealing material into the sealing channel, the dosing head or the carrier component then is moved in a shifting direction extending along the sealing channel.

In one design variant, during incorporation of the sealing material the carrier component is at least temporarily held inclined relative to the horizontal and preferably also inclined relative to the dosing head. In such a design variant, the flat carrier component thus is not provided with a sealing material in that the carrier component is held substantially parallel to the horizontal, i.e. for example is processed horizontally, as has been common practice so far, and the dosing head introduces sealing material into the circumferential sealing channel substantially orthogonally to the carrier plane, wherein for this purpose the dosing head is moved along the edge of the carrier component or the carrier component itself is rotated relative to the dosing head about an axis of rotation vertical to the carrier plane. Rather, in one design variant a preferably automated manufacture of the seal on the carrier component is provided, in which the carrier component is held inclined relative to the horizontal within a processing device, while the seal—at least in the protruding region—is injection-molded.

For manufacturing the seal, which at the end of the manufacturing process usually is present in the form of a sealing bead on the carrier component, it can be provided alternatively or in addition that during introduction of the sealing material the dosing head of the dosing tool at least temporarily is held inclined relative to the vertical and preferably also inclined relative to the carrier component, in order to manufacture the seal especially in the protruding region of the carrier component.

Corresponding to one of the aforementioned design variants it can also be provided in a manufacturing method according to the invention that an individual sealing channel with several cross-sectional profiles is provided on the carrier component or several sealing channels spatially separated from each other with profiles designed differently in cross-section are provided on the carrier component.

In a protruding region, for example, the sealing channel with the channel plane extending inclined relative to the carrier plane can be provided, while outside the protruding region a conventional sealing channel or a conventional cross-sectional profile is provided, in which the edges of the sealing channel lie in a plane extending parallel to the carrier plane. The sealing material thus can be introduced into the sealing channel located outside the protruding region as has been common practice so far, in that the carrier component is aligned such that the carrier plane extends substantially along the horizontal. For introducing the sealing material into the protruding region, the carrier component then is inclined with respect to the horizontal during the manufacturing process and/or the dosing head is inclined with respect to the vertical, wherein the geometry of this sealing channel provided according to the invention ensures a take-up of the liquid sealing material without the sealing material flowing away uncontrolled.

Preferably, the sealing material is applied last in the protruding region—in particular when the same is provided merely on one (upper) side of the carrier component—, before the carrier component is transported to a deposition site. To effectively utilize the time necessary for the transport to the deposition site and to hence further optimize the manufacturing method, it can be provided that the carrier component is transported to the deposition site with an inclination relative to the horizontal. Via the resulting oblique position of the carrier component it is ensured that sealing material present in the protruding region and possibly still liquid does not flow away. The transport time then preferably is calculated such that the expanding sealing material cools down within this period to such an extent that it no longer is flowable when the carrier component reaches the deposition site. Within the transport time the sealing material hence cools down e.g. at least to the pour point. Tilting of the flat carrier component at the deposition site thus no longer leads to the fact that sealing material flows away.

For example, for mounting the seal on a flat carrier component for a vehicle door it is provided that expandable sealing material in heated and hence still liquid form is injection-molded to the carrier component via a dosing head, wherein the carrier component and the dosing head here are shifted relative to each other with an average speed of 250 to 300 mm/s. At a typical size of a carrier component for a vehicle door, a total time of 8 to 9 s thus is required for mounting a circumferential seal. When injection molding of the sealing material in the protruding region is effected in an oblique position relative to the horizontal and when the carrier component is transported to the deposition site within 3 to 4 s in this oblique position, it was found that this time window is sufficient for an expanding sealing material to reach at least its pour point and to no longer flow undesirably due to subsequent tilting of the carrier component at the deposition site. Thus, overflowing or crawling of the sealing material or of the injection-molded sealing compound formed therewith no longer can take place. The aforementioned times of course are stated merely by way of example. For example, a shortened transport time would also be possible, in case a sealing material expanding faster is used.

BRIEF DESCRIPTION OF THE DRAWINGS

Further advantages and features of the invention will become apparent from the following description of exemplary embodiments with reference to the attached Figures.

DETAILED DESCRIPTION

Figure 10A:
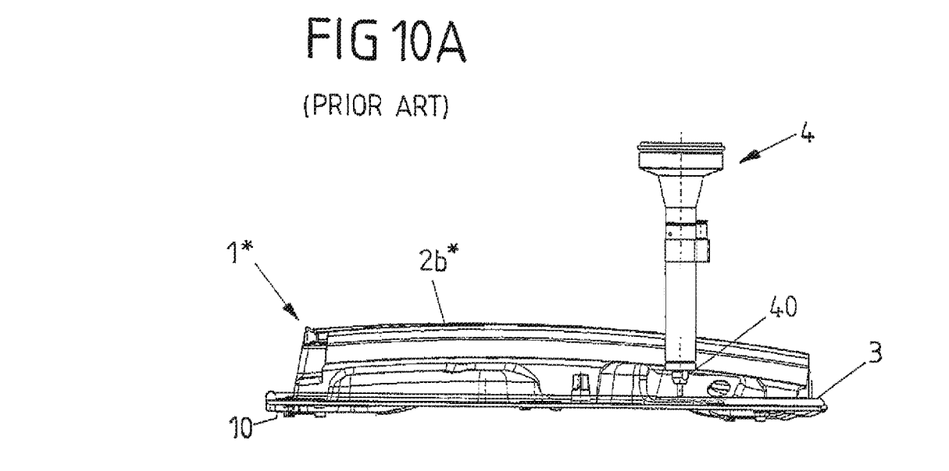
FIGS. 10A-10C show various views of a carrier component formed as assembly carrier and individual phases during its manufacture and assembly according to the prior art.
Figure 10B:
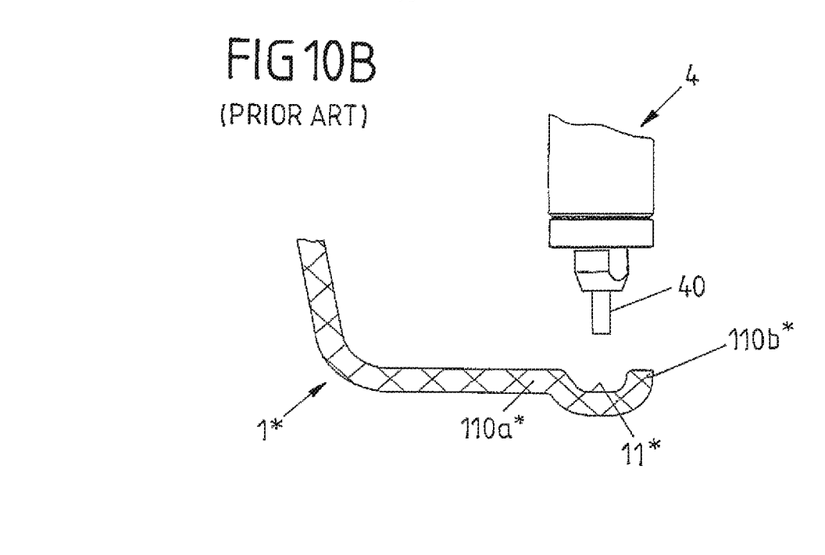
Figure 10C:
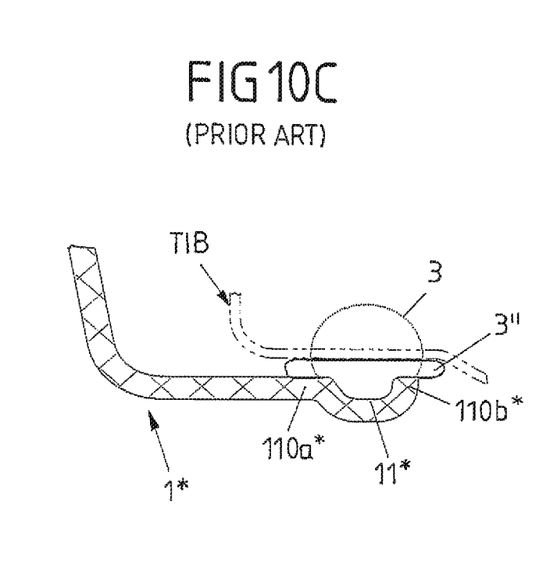

FIGS. 10A, 10B and 10C illustrate a carrier component in the form of an assembly carrier 1* for a motor vehicle door according to the prior art and the commonly used mounting of a seal 3 on such assembly carrier 1*. The assembly carrier 1* is formed flat and defines a carrier base surface 10 which substantially extends along a carrier plane. The assembly carrier 1* usually carries in particular different functional components of a window lifter. These include for example a guide rail 2b* for the guidance of the window pane to be adjusted. Such guide rail 2b* can be integrated on the carrier base surface 10 or be mountable on the same separately.

For sealingly mounting the assembly carrier 1* on a door inner panel TIB of the vehicle door, the assembly carrier 1* includes a circumferential seal 3. This seal 3 is injection-molded along an edge of the assembly carrier 1* in a manner known per se and for example manufactured as sealing bead by an expandable sealing material. Via the seal 3, the assembly carrier 1* can sealingly rest against the door inner panel TIB when properly mounted within the vehicle door, so that via the assembly carrier 1* an assembly opening within the vehicle door, via which a cavity between door outer panel and door inner panel TIB is accessible, is sealingly closed.

For mounting the seal 3 on the assembly carrier 1*, heated and still liquid sealing material is injection-molded to the assembly carrier 1* via a dosing head 4 of a dosing tool. The sealing material exists from a nozzle 40 of the dosing head 4. For receiving the sealing material, a circumferential groove-like sealing channel 11* with a U-shaped cross-section is provided at the edge of the assembly carrier 1*. This sealing channel 11* is bordered by two edges 110a* and 110b*, whose ends lie in a plane parallel to the carrier plane defined by the carrier base surface 10. In this way, the sealing channel 11* is open vertically to the carrier plane, so that the sealing material can be injected into the sealing channel 11* via the dosing head 4 substantially orthogonally to the carrier plane of the assembly carrier 1. For this purpose, the flat assembly carrier 2 usually is held parallel to the horizontal during injection molding of the seal 3 and for example processed in horizontal position.

For injection molding of the circumferential seal 3 the dosing head 4 is moved along the assembly carrier 1*, and the assembly carrier 1* possibly is rotated about an axis of rotation vertical to the carrier plane. Between the portions of the sealing channel 11* and the nozzle 40 of the tool head 4 a certain minimum distance always is provided, in order to prevent conglutination or clogging of the nozzle 40. As is illustrated by FIGS. 10B and 10C, the sealing material of the seal 3 expands and then is compressed on contact of the assembly carrier 1* with the door inner panel TIB, as is illustrated by the reference numeral 3" in FIG. 10C, so that the assembly carrier 1* and the door inner panel TIB sealingly are connected with each other.

Injection molding of the seal 3 to the assembly carrier 1* as illustrated with reference to FIGS. 10A to 10C does not involve major difficulties, as the sealing channel 11* everywhere is accessible for the seal 3 vertically to the carrier plane at the edge of the assembly carrier 1*. Injection molding of the seal 3 however is much more difficult and so far is not possible in an automated process, when portions protruding beyond an edge of the carrier base surface are present on an assembly carrier. This is remedied by the solution according to the invention.

Figure 1A:
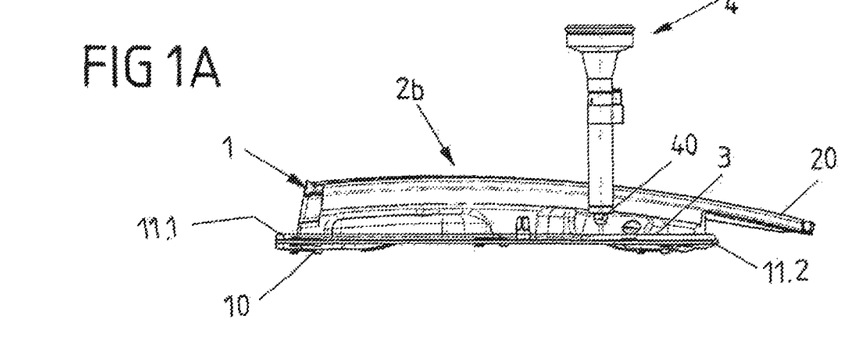
FIGS. 1A-C show various phases of a method according to the invention for manufacturing a seal on a carrier component according to the invention formed as assembly carrier.
Figures 1B, 1C:
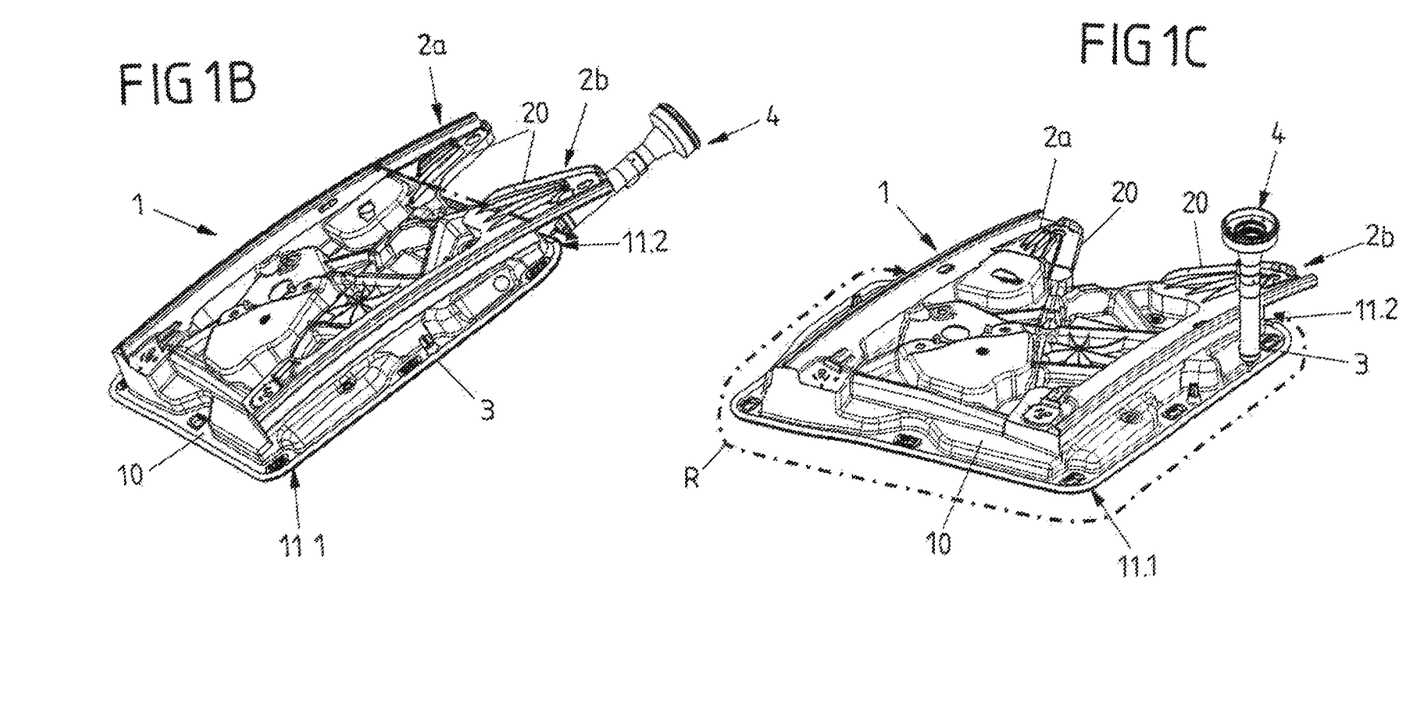
Figure 2A:
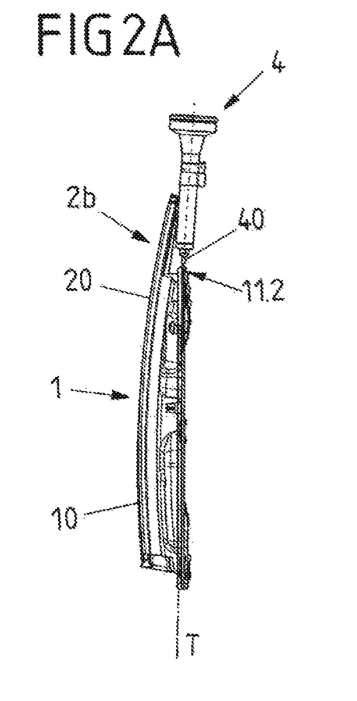
FIGS. 2A-2B in various views show a possible method step for injection molding of a seal in a protruding region of the assembly carrier, in which one end of a guide rail integrated into the assembly carrier protrudes beyond an edge of a carrier base surface.
Figure 2B:
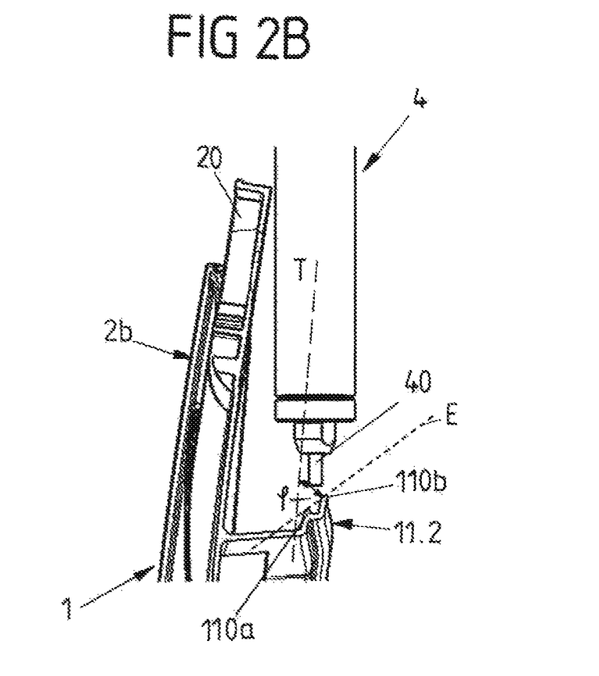

A first exemplary embodiment of a carrier component according to the invention in the form of an assembly carrier 1 and details of a first exemplary embodiment of a manufacturing method according to the invention for injection molding of a seal 3 are shown in FIGS. 1A to 1C. An assembly carrier 1 here includes two integrated guide rails 2a and 2b for a non-illustrated window lifter. Both guide rails 2a and 2b each have a protrusion 20 at an upper edge of the assembly carrier 1. In other words, portions of the two functional components in the form of the guide rails 2a and 2b protrude beyond an outer edge of the carrier base surface 10 of the assembly carrier 1. These portions 20 extend across a part of a sealing channel 11.2 of the assembly carrier 1, so that a seal 3 cannot be injection-molded thereto in a conventional way. On the upper side of the assembly carrier 1 or rather in the region of its upper edge, which is covered by the ends of the integrated guide rails 2a and 2b, a protruding region thus is present, on which a sealing channel 11*, as it is shown in the cross-sectional views of FIGS. 10B and 10C, cannot be utilized to injection-mold expandable sealing material in liquid form thereto. This is possible at best outside this protruding region. Accordingly, a sealing channel 11.1 with a conventional U-shaped cross-sectional profile corresponding to the sealing channel 11* of FIGS. 10A to 10C is provided on the assembly carrier 1 also outside the protruding region, i.e. here along the remaining three lateral edges.

The seal 3 extending around the edge of the assembly carrier 1 thus is injection-molded to two geometrically differently designed sealing channels 11.1 and 11.2 or to one single sealing channel with geometrically differently designed portions 11.1 and 11.2. While injection molding of the sealing material for the seal 3 in the region of the sealing channel 11.1 is effected in a conventional way with horizontally mounted assembly carrier 1, the assembly carrier 1 is placed with an inclination or vertically and/or the dosing head 4 is inclined, in order to introduce still liquid sealing material into the sealing channel 11.2 in the region of the protruding guide rails 2a, 2b. For this purpose, the sealing channel 11.2 is designed different with respect to the sealing channel 11.1 or the sealing channel 11* of FIGS. 10A to 10C, as is illustrated with reference to FIGS. 2A to 9 explained in detail below.

As can be taken from FIGS. 2A-2B and 3A-3B, the sealing channel 11.2 of an assembly carrier 1 designed according to the invention e.g. in cross-section is formed by two protruding legs 110a and 110b which each define an outer edge of the sealing channel 11.2. The groove-like sealing channel 11.2 here is designed J-shaped in cross-section, so that the two legs 110a and 110b in the cross-sectional view have different lengths. Their free ends furthermore lie in a channel plane E which extends inclined relative to the carrier plane T which is defined by the carrier base surface 10. The channel plane E hence connects the ends of the legs 110a, 110b forming the border of the sealing channel 11.2. The channel plane E preferably extends inclined by an angle of inclination φ of 30° to 60° relative to the carrier plane T; in the exemplary embodiment of FIGS. 2A-2B and 3A-3B e.g. inclined by about 45° relative to the carrier plane T.

Figure 3A:
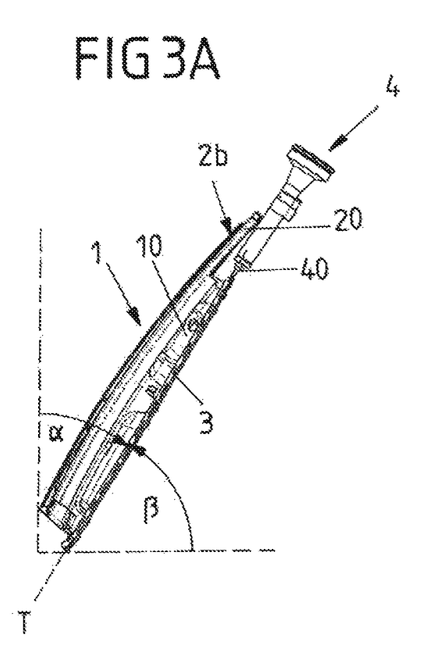
FIGS. 3A-3B in views corresponding with FIGS. 2A and 2B show a possible variant for injection molding of the seal in the protruding region in which the assembly carrier is held inclined relative to the horizontal.
Figure 3B:
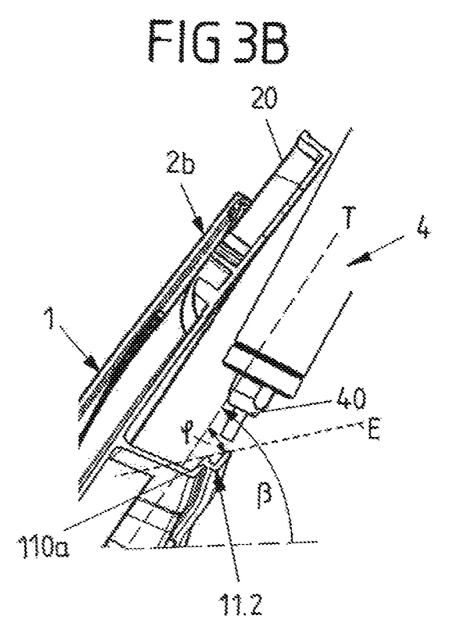

Due to the inventive design of the sealing channel 11.2, the same is open in a direction in space defining the carrier plane T. Via the dosing tool 4, sealing material thus can be introduced into the sealing channel 11.2 parallel to the carrier plane T or with an only small inclination (≤10°) relative to the carrier plane T. It here is ensured by the shape of the sealing channel 11.2 that the liquid sealing material does not flow away during introduction of the liquid sealing material, when the assembly carrier 1 is aligned substantially along a vertical (FIGS. 2A to 2B) or when the assembly carrier 1 is inclined relative to the vertical by an angle α or relative to the horizontal by an angle β (FIGS. 3A to 3B).

For injection-molding of the seal 3, the sealing material here for example first is introduced into the sealing channel 11.1 along a direction of rotation R, while the assembly carrier 1 is aligned horizontally. For introducing the sealing material into the protruding region in which the two guide rails 2a and 2b protrude beyond the carrier base surface 10, the assembly carrier 1 is erected completely or in part and is held in a vertically erected or inclined position. The dosing head 4 then can also be moved into a position inclined relative to the vertical, in order to selectively dose in the liquid sealing material. While in the exemplary embodiment of FIGS. 2A-2B the dosing head 4 always remains in a (largely) vertical position, i.e. is oriented along the vertical, and the assembly carrier 1 follows during injection molding of the seal 3, both the dosing head 4 and the assembly carrier 1 in the exemplary embodiment of FIGS. 3A-3B are inclined for injection molding of the seal 3 in the protruding region, wherein the dosing head 4 preferably always is held inclined by a maximum pitch angle.

Figure 4:
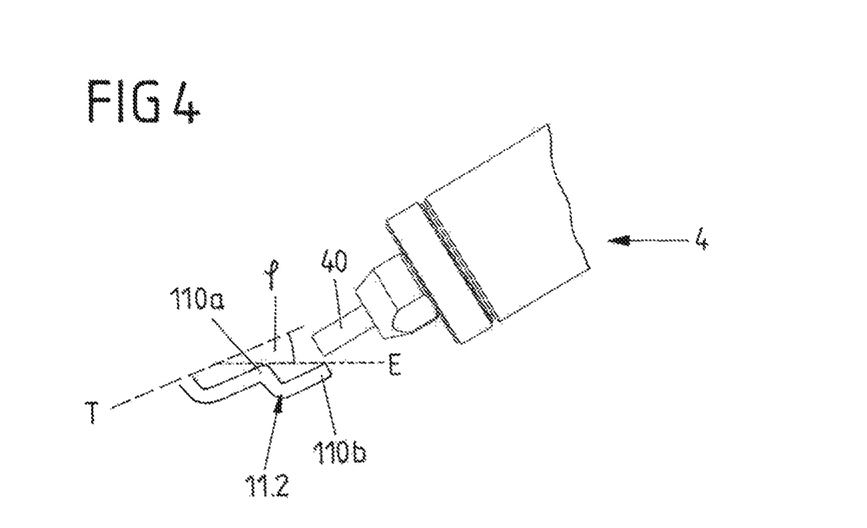
FIG. 4 in an enlarged cross-sectional view shows an illustration of the geometry of a sealing channel of the assembly carrier receiving the sealing material.

In the enlarged cross-sectional representation of FIG. 4, this last-mentioned variant again is illustrated in detail. The assembly carrier 1 here is tilted and held in a position inclined relative to the horizontal to such an extent that the channel plane E, which is defined by the two ends of the legs 110a and 110b visible in cross-section, extends parallel to the horizontal. The sealing channel 11.2 here furthermore has an L-shaped cross-sectional profile in contrast to the exemplary embodiments of FIGS. 2A-2B and 3A-3B. By tilting the assembly carrier 1 it is achieved that in the connecting region of the two legs 110a and 110b the still liquid sealing material 3' is collected.

As is illustrated with reference to FIGS. 5A and 5B, liquid sealing material 3' is dosed in here with such a quantity that after expansion the seal 3 is supported on the two legs 110a and 110b and the same thus can serve as abutment when the assembly carrier 1 is connected with the door inner panel TIB. A filling height of the sealing material here is chosen such that a filling plane F defined by the liquid surface does not reach up to the channel plane E. The sealing channel 11.2 thus only partly is filled with sealing material, so that a total length or height $h_b$ of the longer (outer) leg 110b is not utilized completely and an unwetted portion of the leg 110b with a height h≈½ $h_b$ is left. On this unwetted portion of the leg 110b, however, the expanded sealing material is supported when its volume has increased by a multiple with respect to the liquid condition. The longer leg 110b thus absorbs a large part of the sealing force D which is exerted by mounting the assembly carrier 1 on the door inner panel TIB, when the expanded seal 3 is pressed against a sealing surface W of the door inner panel TIB.

Figure 5A:
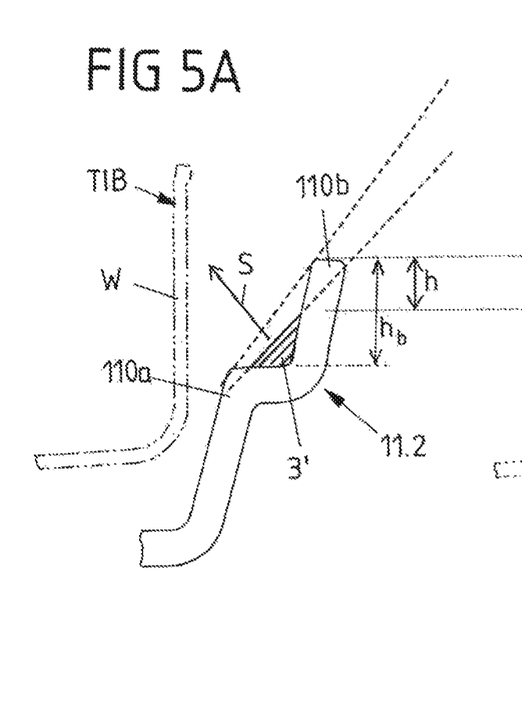
FIGS. 5A-5B show enlarged representations of the sealing channel in the protruding region in a cross-sectional view with liquid sealing material injection-molded thereto on the one hand and expanded sealing material on the other hand.
Figure 5B:
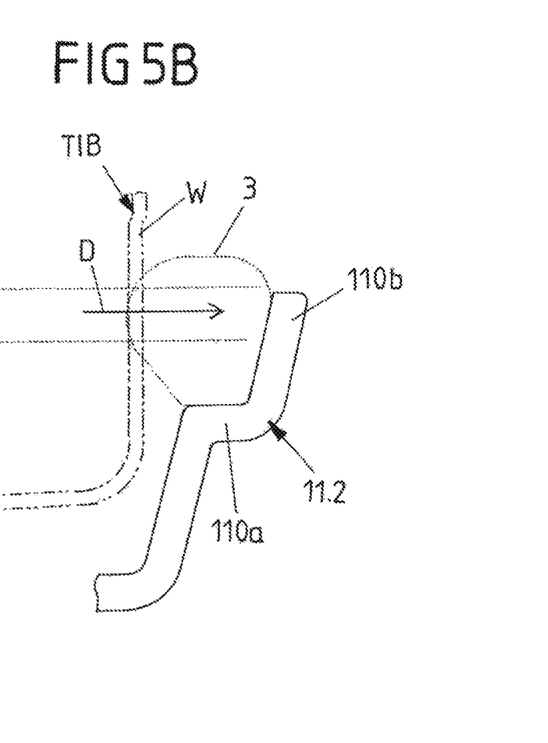

Via the L-shape and the legs 110a and 110b of the sealing channel 11.2 hence preferably oriented at an angle of about 90° relative to each other a preferred direction of expansion S also is specified for the sealing material, as is illustrated by way of example in FIG. 5A. This direction of expansion S preferably points out of the sealing channel 11.2 and includes an approximately identical angle with both legs 110a or 110b.

Figure 6A:
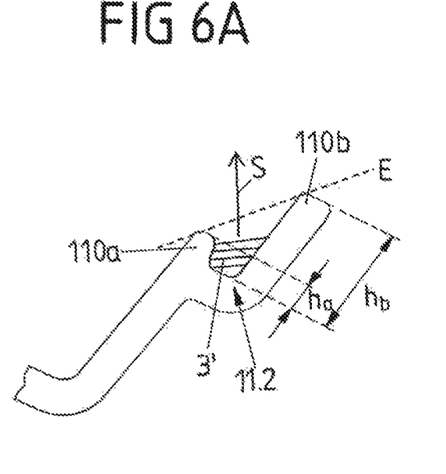
FIGS. 6A-6B in different cross-sectional views show a further exemplary embodiment of a sealing channel on an assembly carrier according to the invention.
Figure 6B:
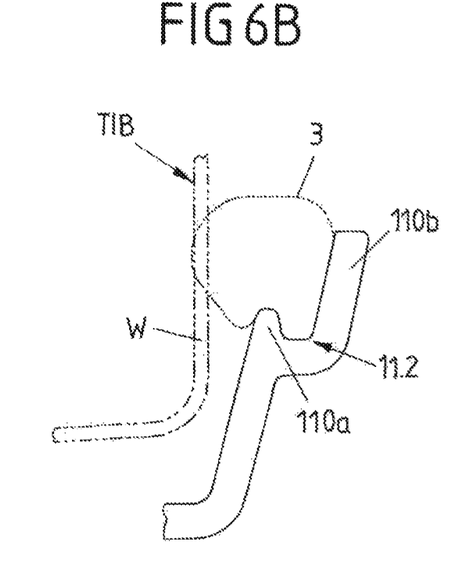

In the exemplary embodiment of FIGS. 6A and 6B a J-shaped sealing channel 11.2 again is illustrated in an enlarged representation. Here, the different lengths or heights $h_a$ and $h_b$ of the two legs 110a and 110b are shown in detail. The shorter leg 110a likewise protruding here with respect to an L-shaped cross-sectional shape prevents flowing out of the still liquid sealing material 3' also with a smaller inclination of the assembly carrier 1. As can be taken from FIG. 6B, which illustrates the expanded seal 3 with properly mounted assembly carrier 1, the comparatively short leg 110a (with $h_a \leq \frac{1}{3} h_b$ or $h_a \leq \frac{1}{4} h_b$) here hardly impedes the expansion of the sealing material out of the sealing channel 11.2.

Figure 7A:
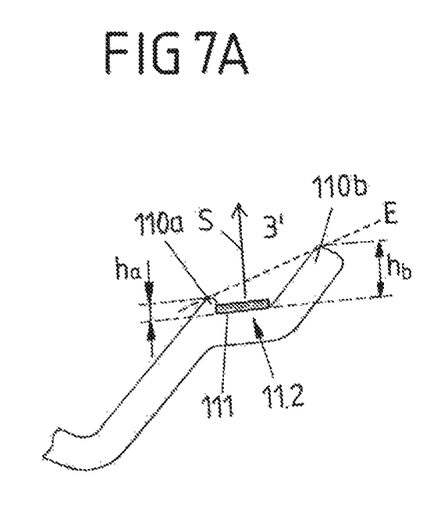
FIGS. 7A-7B show a further exemplary embodiment of an assembly carrier according to the invention with an enlarged representation of the sealing channel in the protruding region in a cross-sectional view.
Figure 7B:
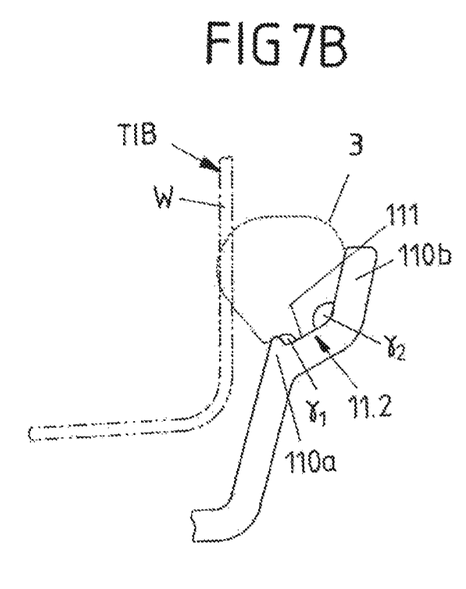

While in the exemplary embodiment of FIGS. 6A and 6B the two legs 110a and 110b of the sealing channel 11.2 include substantially the same obtuse angle relative to a channel bottom connecting the two legs 110a, 110b, a different orientation relative to a channel bottom 111 each is chosen in the exemplary embodiment of FIGS. 7A and 7B for the two legs 110a and 110b. Here, the first shorter (inner) leg 110a extends at an angle $\gamma_1$ to the channel bottom 111, which is smaller than an angle $\gamma_2$ at which the second longer (outer) leg 110b extends to the channel bottom 111. While the angle $\gamma_1$ between the shorter leg 110a and the channel bottom 111 here is about 90°, the angle $\gamma_2$ between the longer, outer leg 110b and the channel bottom 111 is an obtuse angle, for example in the range from 115° to 145°, in particular of about 135°.

In addition, the channel bottom 111 in this variant—in particular in contrast to the exemplary embodiment of FIGS. 6A and 6B—is designed flat and planar. Thus, on introduction of the still liquid sealing material 3' and with a corresponding inclination of the assembly carrier 1, the channel bottom 111 extends substantially parallel to the horizontal.

Figure 8A:
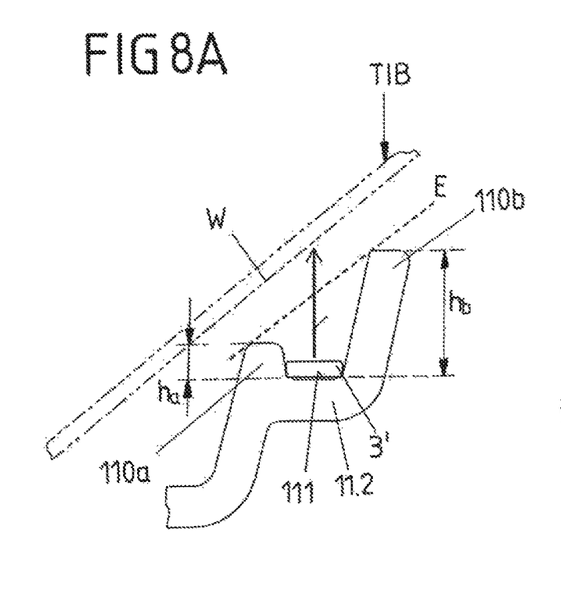
FIGS. 8A-8B partially and in a cross-sectional view show an exemplary embodiment according to the invention of an assembly with an assembly carrier and a door inner panel with inclined sealing surface, against which the assembly carrier is pressed with its expanded seal.
Figure 8B:
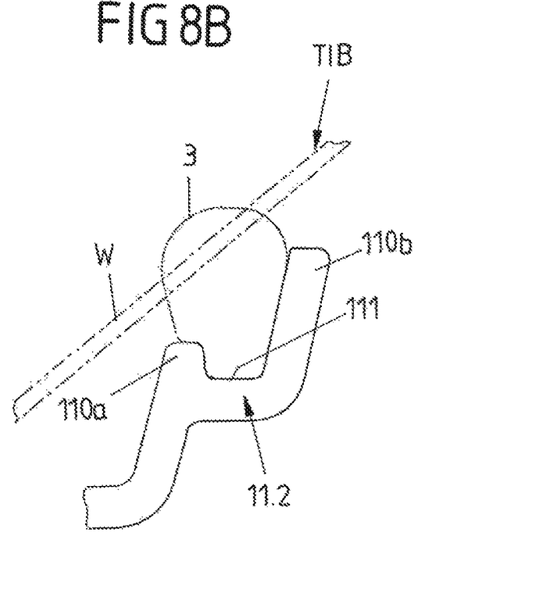
Figure 9:
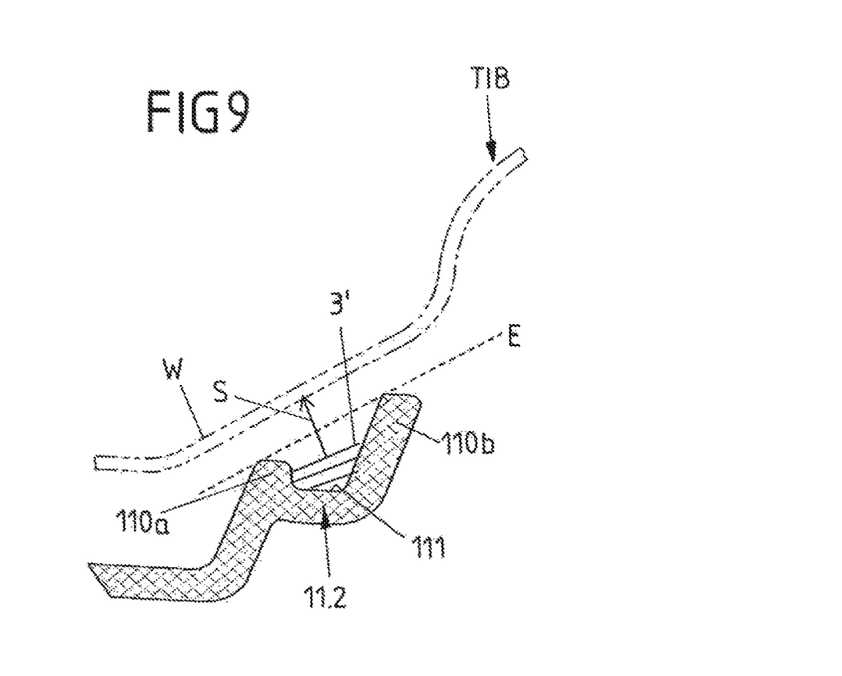
FIG. 9 shows a further exemplary embodiment of an assembly according to the invention with a sealing channel modified with respect to the exemplary embodiment of FIGS. 8A and 8B and with a modified manufacturing method

FIGS. 8A-8B and 9 illustrate a (vehicle door) assembly partially and in a cross-sectional view, in which an assembly carrier 1 according to the invention each is combined with a door inner panel TIB which includes an oblique sealing surface W against which the seal 3 rests when the assembly carrier 1 is properly mounted. The sealing surface W of the door inner panel TIB here is inclined obliquely to the outside with respect to the vertical, in order to provide for an improved contact of the seal 3 in the protruding region of the assembly carrier 1.

The design variants of FIGS. 8A-8B and 9 above all differ in the angle of inclination between carrier plane T and channel plane E, the inclination of the legs 110a, 110b relative to the channel bottom 111 and the inclination of the sealing surface W relative to the vertical. In the variant of FIG. 9 as compared to the variant of FIGS. 8A-8B the angle of inclination between the longer outer leg and the channel bottom 111 is greater and correspondingly the angles of inclination between carrier plane T and channel plane E and between sealing surface W of the door inner panel and the vertical hence are greater.

In principle, when injection-molding the seal 3 to the assembly carrier 1 with its sealing channel 11.2 formed according to the invention, the introduction of the sealing material 3' preferably is effected fully automated, wherein the seal 3 in the protruding region finally is injection-molded to the assembly carrier 1 usually manufactured from a plastic material. Independent of the illustrated cross-sectional profile of the sealing channel 11.2 it can be advantageous that during injection-molding of the seal 3 in the protruding region and for the subsequent transport to a deposition site the assembly carrier 1 is held in an inclined or erected position, for example corresponding to FIG. 2A or 3A. The transport time until reaching the deposition site, at which the assembly carrier 1 is deposited, so that its carrier plane T extends parallel to the horizontal, preferably is calculated such that the expanding sealing material cools down at least to the pour point. Upon reaching the deposition site, the sealing material or the sealing compound thus no longer is flowable and hence in particular no longer able to flow along or in the sealing channel 11.2 or 11.2 or out of the same solely under the effect of gravity.

With the solution according to the invention, a seal 3 thus can easily be mounted also in the case of (plastic) carrier components, for example assembly carriers or module carriers, with portions protruding beyond a carrier base surface 10, by maintaining an automatable method for injection molding an expandable sealing material. In particular in the case of assembly carriers 1 with integrated guide rails 2a and 2b, the solution according to the invention was found to be particularly advantageous.

LIST OF REFERENCE NUMERALS

1, 1* assembly carrier (carrier component)
10 carrier base surface
11* sealing channel
11.1, 11.2 sealing channel
110a, 110b leg
**110a*, 110b*** edge portion
111 channel bottom
20 protrusion
2A, 2b, 2b* guide rail
3, 3', 3" seal/sealing material
4 dosing head
40 nozzle
D sealing force
E channel plane
F filling plane
h, $h_a$, $h_b$ height
R direction of rotation
S direction of expansion
T carrier plane
TIB door inner panel (vehicle part)
W sealing surface
$\alpha$, $\beta$, $\varphi$, $\gamma_1$, $\gamma_2$ angle

The invention claimed is:

1. A carrier component for a vehicle, the carrier component comprising:
   a carrier base surface which defines a carrier plane extending in a first direction;
   at least one sealing channel extending along an outer edge of the carrier base surface;
   a seal injection molded to the at least one sealing channel and at least partly accommodated therein, wherein via the seal the carrier component can sealingly be mounted on a vehicle part; and
   at least one integrated guide rail of a window lifter, wherein the at least one integrated guide rail and the carrier base surface form a single component and wherein the at least one integrated guide rail protrudes with a rail portion beyond the outer edge of the carrier base surface so that the rail portion of the at least one integrated guide rail extends across at least a part of the at least one sealing channel,
   wherein, at least in a region behind the rail portion, a cross-section of the part of the at least one sealing channel across which the rail portion extends comprises a first leg and a second leg defining an outer edge of the at least one sealing channel so that the sealing channel is open in the first direction, wherein the first and second legs have different lengths and a first end of the first leg and a second end of the second leg are offset from each other so that a channel plane connects the first and second ends.

2. The carrier component according to claim 1, wherein the sealing channel is J- or L-shaped in cross-section at least in the region behind the rail portion.

3. The carrier component according to claim 1, wherein the sealing channel is U- or V-shaped in cross-section at least in the region behind the rail portion.

4. The carrier component according to claim 1, wherein the first and second legs are formed to protrude from the carrier base surface.

5. The carrier component according to claim 1, wherein the first and second legs are connected to one another via a channel bottom of the sealing channel extending between the first and second legs.

6. The carrier component according to claim 5, wherein the first and second legs extend at different angles to the channel bottom.

7. The carrier component according to claim 6, wherein the first and second legs have different lengths defining a first shorter leg and a second longer leg, wherein the first shorter leg extends at an angle to the channel bottom which is smaller than an angle at which the second longer leg extends to the channel bottom.

8. The carrier component according to claim 5, wherein one of the first and second legs extends at an obtuse angle to the channel bottom.

9. The carrier component according to claim 1, wherein the sealing channel includes at least two channel portions which differ in cross-section.

10. An assembly, comprising the carrier component according to claim 1 and the vehicle part against which the carrier component sealingly rests via the seal and which includes a sealing surface extending inclined relative to the carrier base surface.

11. A method for manufacturing the seal on the carrier component according to claim 1, the method comprising manufacturing the seal from an expandable sealing material and inserting the expandable sealing material into the at least one sealing channel in liquid form in a quantity such that after expansion of the sealing material the seal is supported on the at least two legs.

12. The method according to claim 11, wherein the sealing material is introduced into the sealing channel via a dosing head of a dosing tool, and
   wherein, during introduction of the sealing material, the carrier component is at least temporarily held inclined relative to the horizontal, and/or
   wherein, during introduction of the sealing material, the dosing head is at least temporarily held inclined relative to the vertical.

13. The method according to claim 12, wherein the sealing channel is formed to extend around the edge of the carrier component and includes at least two regions which are different from each other in cross-section and/or at least two sealing channels different in cross-section are provided on the carrier component, and depending on region or sealing channel, the carrier component and the dosing head are aligned differently relative to each other.

14. The method according to claim 13, wherein for inserting the sealing material into the sealing channel outside the protruding region, the carrier component is aligned such that the carrier plane is substantially horizontal.

15. The method according to claim 14, wherein the carrier component is inclined with respect to the horizontal and/or the dosing head is inclined with respect to the vertical for inserting the sealing material in the protruding region into the sealing channel including the at least two legs.

16. The method according to claim 12, wherein the carrier component inclined relative to the horizontal is transported to a deposition site, after the sealing material has properly been provided thereon.

17. The carrier component according to claim 1, wherein at least two sealing channels being different in cross-section are provided on the carrier component.

18. A carrier component for a vehicle, the carrier component comprising:
   a carrier base surface extending in a first direction;
   at least one sealing channel extending along an outer edge of the carrier base surface;
   a seal injection molded to the at least one sealing channel and at least partly accommodated therein, wherein via the seal the carrier component can sealingly be mounted on a vehicle part; and
   at least one integrated guide rail of a window lifter, wherein the at least one integrated guide rail and the carrier base surface form a single component and protrudes beyond the outer edge of the carrier base surface so that the rail portion of the at least one integrated guide rail extends across at least a part of the at least one sealing channel,
wherein, at least in a region behind the rail portion, a cross-section of the part of the at least one sealing channel across which the rail portion extends comprises a first leg and a second leg, defining an outer edge of the at least one sealing channel so that the sealing channel is open in the first direction in space, wherein a first end of the first leg and a second end of the second leg are offset from each other, so that a channel plane connecting the first and second ends is inclined to the carrier plane, so that the sealing channel is open in a direction in space defining the carrier plane and being parallel to the carrier plane; and
wherein the sealing channel comprises a bottom connecting the first and second legs to one another and extending between the first and second legs, the first and second legs protruding from the channel bottom along the first direction and extending at different angles with respect to the channel bottom.

* * * * *

UNITED STATES PATENT AND TRADEMARK OFFICE
CERTIFICATE OF CORRECTION

| | | |
|---|---|---|
| PATENT NO. | : 10,668,791 B2 | Page 1 of 1 |
| APPLICATION NO. | : 15/084283 | |
| DATED | : June 2, 2020 | |
| INVENTOR(S) | : Nico Oertel et al. | |

It is certified that error appears in the above-identified patent and that said Letters Patent is hereby corrected as shown below:

On the Title Page

Item [71], delete "KG," and insert -- KG, Hallstadt, --

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*